United States Patent Office 2,702,827
Patented Feb. 22, 1955

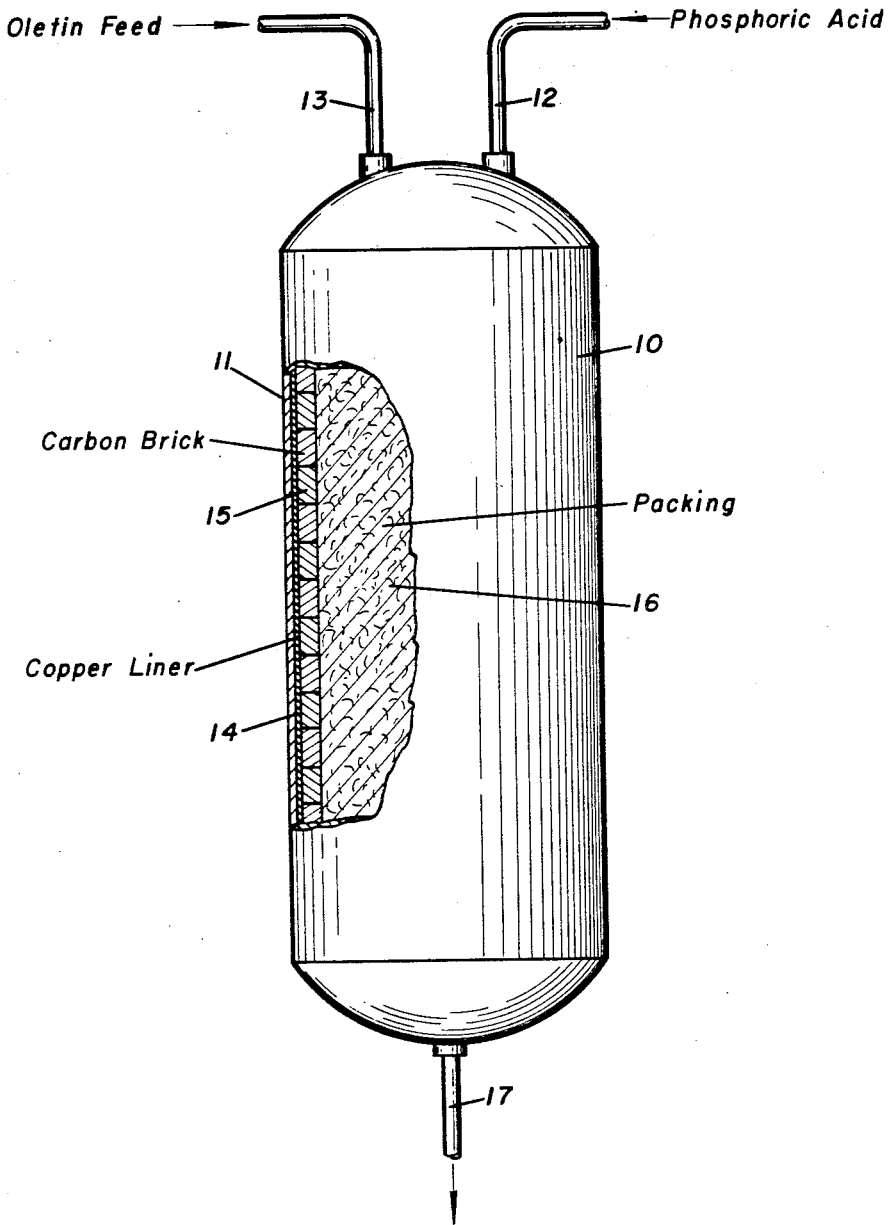

2,702,827

REDUCTION OF PHOSPHORIC ACID CORROSION IN A POLYMERIZATION PROCESS

Sam R. Bethea, Baytown, Tex., assignor, by mesne assignments, to Standard Oil Development Company, Elizabeth, N. J., a corporation of Delaware Application May 28, 1951, Serial No. 228,594

4 Claims. (Cl. 260—683.15)

The present invention is directed to a method and apparatus for converting hydrocarbons. More particularly, the invention is directed to the catalytic conversion of a convertible hydrocarbon feed including an olefin. The invention is specifically directed to polymerization of olefins.

The present invention may be described briefly as involving the catalytic conversion of a convertible hydrocarbon including an olefin such as polymerization of a mono-olefin having from 2 to 6 carbon atoms by contacting a vaporized feed hydrocarbon with a liquid phosphoric acid catalyst in a reaction zone defined by a copper surface at a reaction temperature in the range from 280° to 600° F. and at a pressure from atmospheric to 7000 p. s. i. g., the feature of the present invention being maintaining a substantially static film of phosphoric acid in contact with the metallic copper surface while forming a product and recovering the product.

The substantially static film of liquid phosphoric acid may be maintained by providing a ferrous metal reactor which has its interior surface lined with a continuous metallic copper liner over which is provided a second liner of carbon, such as porous carbon brick. The porous nature of the carbon brick allows phosphoric acid to filter therethrough onto the copper surface. The phosphoric acid has substantially a slow flow rate through the carbon brick and causes a film of phosphoric acid which is in a substantially static condition to form on the copper liner. The film of phosphoric acid forms a protective film from the dynamic flow of phosphoric acid past the carbon brick in the interior of the reaction zone and protects the copper liner of same from the corrosive and erosive action of the substantially high velocity flow of phosphoric acid. It is believed that a protective film of corrosion product may build up on the copper surface under the static film of phosphoric acid which serves to protect the copper liner from further corrosion, the substantially static film of phosphoric acid being maintained by the small amount of phosphoric acid filtering through the brick liner.

The temperatures employed in the practice of the present invention may range from 280° to about 600° F. A preferred temperature range is from 300° to 500° F.

Pressures employed in the practice of the present invention may range from atmospheric up to about 7000 p. s. i. g., with a preferred range from about 300 to 500 p. s. i. g. Increasing the pressure results in increased contact times and increases the yields to a remarkable extent.

In practicing the present invention the olefin containing feed stock may be employed in either the liquid or the vapor phase and it may contact the liquid phosphoric acid concurrently in the reaction zone defined by the metallic copper surface in accordance with the present invention. Another way of contacting the liquid phosphoric acid catalyst with the olefin containing feed is by forming a pool or column of the liquid phosphoric acid catalyst and allowing the olefin feed to bubble upwardly therethrough through suitable jets. It is desirable in the practice of the present invention to provide contacting material, such as carbon Berl saddles, Raschig rings, other packing, and any of the conventional distribution means employed. Glass and other silica-containing materials are attacked readily by the strong phosphoric acids at the reaction conditions and are therefore undesirable as packing materials. Substantially pure silica, such as fused silica or pure silica sand is not substantially attacked and may be employed. There are other materials, such as nickel-molybdenum-iron alloys, tantalum, illium, and the like which are not attacked by phosphoric acid and which might make suitable packing material, but these are generally too expensive to be employed in commercial operations.

In an operation where packing materials are employed for contacting the phosphoric acid with the olefin feed the olefins in a vaporized condition may be introduced preferably under concurrent flow conditions. The preheated vaporized olefinic feed and phosphoric acid are introduced into the top of the reactor whose interior surface is defined by a metallic copper liner and the liquid catalyst flows down over the packing and out of the bottom of the reactor through an outlet into a separator from which it is pumped back to the reactor inlet. Any hydrocarbon phase that may be condensed in the reactor near the reactor outlet also flows to the bottom of the reactor. The combined streams flowing out of the bottom of the reactor are passed through a cooler and then the acid and hydrocarbon phases are discharged into a settler where the two phases are separated. The hydrocarbon phase is then withdrawn from the separator and discharged into a suitable separating means, such as a distillation tower, to separate polymer and unreacted materials, which may be recycled, if desired, to the feed.

The olefins forming the feed of the present invention will include the olefins containing from two to about six carbon atoms in the molecule and may be exemplified by ethylene, propylene, the butylenes, pentylenes and hexylenes. When ethylene forms a portion of the feed stock it should be employed in admixture with another olefin having a greater number of carbon atoms since efforts to polymerize ethylene alone have been largely unsuccessful in that low yields were obtained. It is contemplated that the olefin feed stock of the present invention may be used in the pure state or in admixture with other olefins or other hydrocarbons. For example, propylene is a preferred feed stock and it is usually obtained in the petroleum refinery in admixture with ethylene, propane, and possibly some butylenes and butadiene. Thus, while a pure hydrocarbon will be the preferred feed stock, it is within the spirit and scope of my invention to use mixtures of the various olefins or mixtures of olefins with other hydrocarbons such as aromatics.

In the practice of my invention, the liquid phosphoric acid is an aqueous acid which may vary in concentration from 50% to 115% $H_3PO_4$. The acid concentrations most useful in the polymerization of olefins such as propylene, for example, are in the range from 75% to 115% of $H_3PO_4$.

In the practice of my invention, it is also desirable to exclude free oxygen from the materials which come in contact with the copper reactor lining. This is, in general, satisfactorily achieved by excluding oxygen from the hydrocarbon feed by well known means, such as by blanketing the feed hydrocarbon storage tanks with an inert gas; or by adding an oxidation inhibitor of the phenolic or quinoid type, such as para-tert. butyl catechol or hydroquinone to the hydrocarbon in small but effective amounts of nor more than 1 per cent; or by treating the free oxygen-containing hydrocarbon solution with an oxygen consuming reagent such as an alkaline solution of pyrogallol or of cuprous oxide. Oxygen may also be removed from the hydrocarbon by a stripping or distillation operation.

The invention will be further illustrated by reference to the drawing in which the sole figure is a sectional view of a reaction vessel illustrating the flow of reactants and catalyst as well as the liners therefor.

Referring now to the drawing, numeral 11 desginates the wall of a ferrous metal pressure vessel 10, such as a steel vessel. The vessel 10 is provided with at least an inlet thereto and an outlet. The vessel 10 has an inlet 12 for introduction of phosphoric acid into the reaction vessel and a second inlet 13 for introduction of olefinic feed. The wall 11 is suitably provided with a copper liner 14 which is arranged adjacent the wall 11 of reaction vessel 10. This copper liner may be provided as a continuous copper liner to protect the interior surface of the vessel 10. Superimposed on the copper liner 14 is a liner of carbon brick 15 which covers the copper liner 14; thus as phosphoric acid is introduced into the vessel 10 through inlet 12 it contacts the carbon brick liner 15 which is of a porous nature and flows over packing material 16 in contact with the hydrocarbon feed. The phosphoric acid slowly filters through the carbon brick and comes into contact with the copper liner 14 and forms thereon a substantially static film of phosphoric acid which reacts with the copper to form corrosion products. By virtue of the substantially static film of phosphoric acid on the copper liner 14, the corrosion products are not swept off and the copper liner is protected from further corrosion by the phosphoric acid flowing through the reaction vessel 11. The reaction products including phosphoric acid are withdrawn from the vessel 10 through outlet 17 and may be discharged into cooling and separation zones for separation of the phosphoric acid and the hydrocarbons to allow recycling of the phosphoric acid and unreacted feed and recovery of the desired product. The flow rate of the substantially static film of phosphoric acid on the copper liner 14 is essentially zero whereas the velocity of flow in the reactor vessel 10 where the olefinic feed is contacted with the phosphoric acid may be as high as 1000 feet per minute.

Thus, in accordance with the present invention, it is possible to provide a method and apparatus therefor for converting hydrocarbons whereby the vessel 10 is substantially unattacked by the corrosive nature of the phosphoric acid, the steel or ferrous metal vessel being protected by the copper liner 14 and the copper liner being protected by the static film of phosphoric acid maintained thereon by virtue of the porous carbon brick liner 15 arranged in juxtaposition with the copper liner.

To illustrate the beneficial effects of the present invention, it has been found that the corrosive rate of 98% H$_3$PO$_4$ to copper at a temperature of 360° F. increases from 0.015 to 0.05 inch per year when the rate of phosphoric acid flow over a copper surface is increased from substantially 0 to 4 feet per minute. In other words, under static conditions phosphoric acid is substantially non-corrosive to copper but under dynamic flow conditions it is very corrosive to a copper surface. By providing a reaction vessel with a copper liner wherein a static film of phosphoric acid is maintained on the liner, it is possible to conduct conversion operations such as polymerization and alkylation without destruction of the vessel.

The present invention is adapted broadly to conversion operations, such as alkylation and polymerization in which an olefinic feed is employed. For example the invention may be used in polymerizing mono-olefins to olefins having higher molecular weights than the olefinic feed.

The present invention may also be employed in the alkylation of aromatics with olefins. In such reactions, an excess of an alkylatable aromatic hydrocarbon, such as benzene, toluene, xylene, or the like, is contacted with an olefin in the presence of liquid phosphoric acid under suitable conditions of temperature and pressure as mentioned before with respect to polymerization, to form an alkylated aromatic hydrocarbon. The olefins employed as alkylating agents will include the olefins enumerated before, as well as olefins of higher molecular weight, such for instance, as those having nine to twelve carbon atoms.

The invention may be employed in other catalytic operations where phosphoric acid catalysts of the type illustrated are used. Illustrative of such operations including the contacting of liquid phosphoric acid with hydrocarbons or their derivatives at an elevated temperature, are the alkylation of phenols, and the like, with olefins.

While the invention has been described and illustrated by reference to a reaction zone defined by a metallic copper surface in which the film of phosphoric acid is maintained thereon by providing a liner of porous carbon brick superimposed on the copper liner, it is understood that the invention may be practiced with other apparatus wherein a static film of phosphoric acid is maintained on the copper liner. For example, it may be desirable to provide a copper lined reactor having a baffle of material which is unsusceptible to attack by phosphoric acid to protect the copper liner from the flow of phosphoric acid. The copper liner may then be flooded with phosphoric acid to provide a film thereon and the excess phosphoric acid drained from the surface of the copper. It may be necessary when such operations are conducted to renew the film of phosphoric acid periodically.

The nature and objects of the present invention having been completely described and illustrated, what I wish to claim as new and useful and to secure by Letters Patent is:

1. A method for protecting a continuous copper lining in a ferrous reaction vessel in which liquid phosphorus acid having a strength in the range between 75% and 115% H$_3$PO$_4$ is employed as a catalytic body for converting convertible hydrocarbons at temperatures in the range between 280° and 600° F. which comprises forming a substantially static film of said liquid phosphoric acid on said copper lining, supplying a sufficient amount of said liquid phosphoric acid to said film to maintain same, and protecting said film from direct contact with said body by superimposing a porous carbon brick lining on said copper lining.

2. A method in accordance with claim 1 in which the liquid phosphoric acid is supplied continuously to the film.

3. A method in accordance with claim 1 in which the liquid phosphoric acid is supplied periodically to the film.

4. A method for protecting a continuous copper lining in a ferrous reaction vessel in which liquid phosphoric acid having a strength in the range between 75% and 115% H$_3$PO$_4$ is employed as a catalytic body for polymerizing olefins at temperatures in the range between 280° and 600° F. and at a pressure at least atmospheric which comprises forming a substantially static film of said liquid phosphoric acid on said copper lining, maintaining said film on said copper lining by continuously supplying a sufficient amount of said liquid phosphoric acid to said film, and protecting said film from direct contact with said body by superimposing a porous carbon brick lining on said copper lining.

References Cited in the file of this patent

UNITED STATES PATENTS

| Number | Name | Date |
|---|---|---|
| 2,186,021 | Holm et al. | Jan. 9, 1940 |
| 2,373,888 | Hachmuth | Apr. 17, 1945 |
| 2,385,237 | Stahly et al. | Sept. 18, 1945 |
| 2,398,546 | Messmore | Apr. 16, 1946 |
| 2,404,574 | Hammond | July 23, 1946 |
| 2,414,328 | Pinkerton | Jan. 14, 1947 |
| 2,415,797 | Low | Feb. 11, 1947 |
| 2,425,493 | Stapleton | Aug. 12, 1947 |
| 2,547,013 | Kemp et al. | Apr. 3, 1951 |